(12) United States Patent
Monga et al.

(10) Patent No.: US 9,043,320 B2
(45) Date of Patent: May 26, 2015

(54) ENHANCED FIND-IN-PAGE FUNCTIONS IN A WEB BROWSER

(75) Inventors: Rohan Monga, Punjab (IN); Sudharsan Vasudevan, Tamil Nadu (IN); Hemanth Sambrani, Karnataka (IN)

(73) Assignee: YAHOO! INC., Sunnyvale, CA (US)

( * ) Notice: Subject to any disclaimer, the term of this patent is extended or adjusted under 35 U.S.C. 154(b) by 727 days.

(21) Appl. No.: 12/710,008

(22) Filed: Feb. 22, 2010

(65) Prior Publication Data

US 2011/0208707 A1    Aug. 25, 2011

(51) Int. Cl.
*G06F 17/30*    (2006.01)

(52) U.S. Cl.
CPC .... *G06F 17/30722* (2013.01); *G06F 17/30864* (2013.01); *G06F 17/30997* (2013.01)

(58) Field of Classification Search
CPC ...................... G06F 17/30864; G06F 17/30997
USPC ........... 707/732, 769, 728; 715/760, 234, 207
See application file for complete search history.

(56) References Cited

U.S. PATENT DOCUMENTS

| | | | | |
|---|---|---|---|---|
| 6,661,432 | B1 * | 12/2003 | McBrearty et al. ........... | 715/760 |
| 6,823,491 | B1 * | 11/2004 | McBrearty et al. ........... | 715/207 |
| 7,752,222 | B1 * | 7/2010 | Cierniak ........................ | 707/769 |
| 2001/0032254 | A1 * | 10/2001 | Hawkins ....................... | 709/219 |
| 2002/0002607 | A1 * | 1/2002 | Ludovici et al. .............. | 709/223 |
| 2002/0041399 | A1 * | 4/2002 | Ichikawa ....................... | 358/402 |
| 2002/0052935 | A1 * | 5/2002 | Paxhia et al. ................. | 709/220 |
| 2008/0140644 | A1 * | 6/2008 | Franks et al. ...................... | 707/5 |
| 2009/0216735 | A1 * | 8/2009 | Dexter et al. ..................... | 707/5 |
| 2010/0005001 | A1 * | 1/2010 | Aizen et al. ................ | 705/14.73 |
| 2010/0100543 | A1 * | 4/2010 | Brady ........................... | 707/732 |
| 2011/0010612 | A1 * | 1/2011 | Thorpe et al. ................. | 715/234 |

OTHER PUBLICATIONS

Yelena Tsymbalenko & Ethan V. Munson, "Using HTML Metadata to Find Relevant Images on the World Wide Web", Jan. 9, 2001, Proceedings of the 2000 CADIP Research Symposium, 9 pages.*
Superuser.com, "Searching Hidden Text on Web Pages?", posted Sep. 10, 2009, 2 pages.*

* cited by examiner

*Primary Examiner* — Scott A Waldron
(74) *Attorney, Agent, or Firm* — James J. DeCarlo; Greenberg Traurig, LLP

(57) ABSTRACT

A system and method for an enhanced find-in-page query function in a web browser. A find-in-page query is received for at least one webpage displayed on a computing device, wherein the query comprises a search string. Metadata relating to data objects displayed on the webpage is collected from the HTML code comprising the webpage, from the source of the of the plurality of objects, and from at least one search engine. At least one of the plurality of data objects matching the find-in-page query is identified wherein the search string is matched to metadata, wherein metadata relating to the matching data objects comprises the search string. The display of the matching data objects on the webpage is then altered, using the computing device, whereby the user is able to identify the data objects which match the find-in-page query.

28 Claims, 8 Drawing Sheets

ENHANCED FIND-IN-PAGE FUNCTIONS IN A WEB BROWSER

This application includes material, which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for improving the find-in-page functions of web browsers and, more particularly, to improving the find-in-page functions of web browsers by using metadata relating to objects embedded in webpages.

BACKGROUND OF THE INVENTION

Web browsers and programs providing equivalent functionality commonly provide a function to find displayed text in web pages. For example, the Firefox Browser displays a pop-up "Find" window when a user presses "CTRL-F" in which a user can type text the user wishes to locate in the web page. In many instances, however, such functions are limited to searching text nodes in displayed web pages. Thus, such functions do not take full advantage of all data available in the web page, as well as metadata available in data objects embedded in the web page.

SUMMARY OF THE INVENTION

In one embodiment, the invention is a method. A find-in-page query is received for at least one webpage displayed on a computing device, wherein the query comprises a search string. A first set of metadata relating to each of a plurality of data objects displayed on the webpage is collected, using the computing device, wherein the first set of metadata is collected from the HTML code comprising the webpage. A second set of metadata relating to each of the plurality of data objects is collected, using the computing device, wherein the second set of metadata is collected from the source of each of the plurality of objects. A third set of metadata relating to each of the plurality of data objects is collected, using the computing device, wherein the third set of metadata is retrieved, over a network, from at least one search engine. At least one of the plurality of data objects matching the find-in-page query is identified, using the computing device, wherein the search string is matched to metadata in the first, second and third sets of metadata, wherein metadata relating to the at least one data object comprises the search string. The display of the matching data objects on the webpage is then altered, using the computing device, whereby the user is able to identify the data objects that match the find-in-page query.

In another embodiment, the invention is a system. The system comprises a group of modules. Each of the modules comprises one or more processors programmed to execute software code retrieved from a computer readable storage medium storing software for various functions.

The modules comprising the system include: a find-in-page query receiving module for receiving find-in-page queries for a webpage displayed on a computing device, wherein the query comprises a search string; an HTML metadata collection module for collecting a first set of metadata relating to each of a plurality of data objects displayed on the webpage, wherein the first set of metadata is collected from the HTML code comprising the webpage; an object metadata collection module for collecting a second set of metadata relating to each of the plurality of data objects, wherein the second set of metadata is collected from the source of the of the plurality of objects; a web metadata collection module for collecting a third set of metadata relating to each of the plurality of data objects, wherein the third set of metadata is retrieved, over a network, from at least one search engine; a metadata matching module for identifying at least one of the plurality of data objects which matches the find-in-page query, wherein the search string is matched to metadata in the first, second and third sets of metadata; and an object display module for altering the display of the matching data objects on the webpage, whereby the user is able to identify the data objects which match the find-in-page query.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
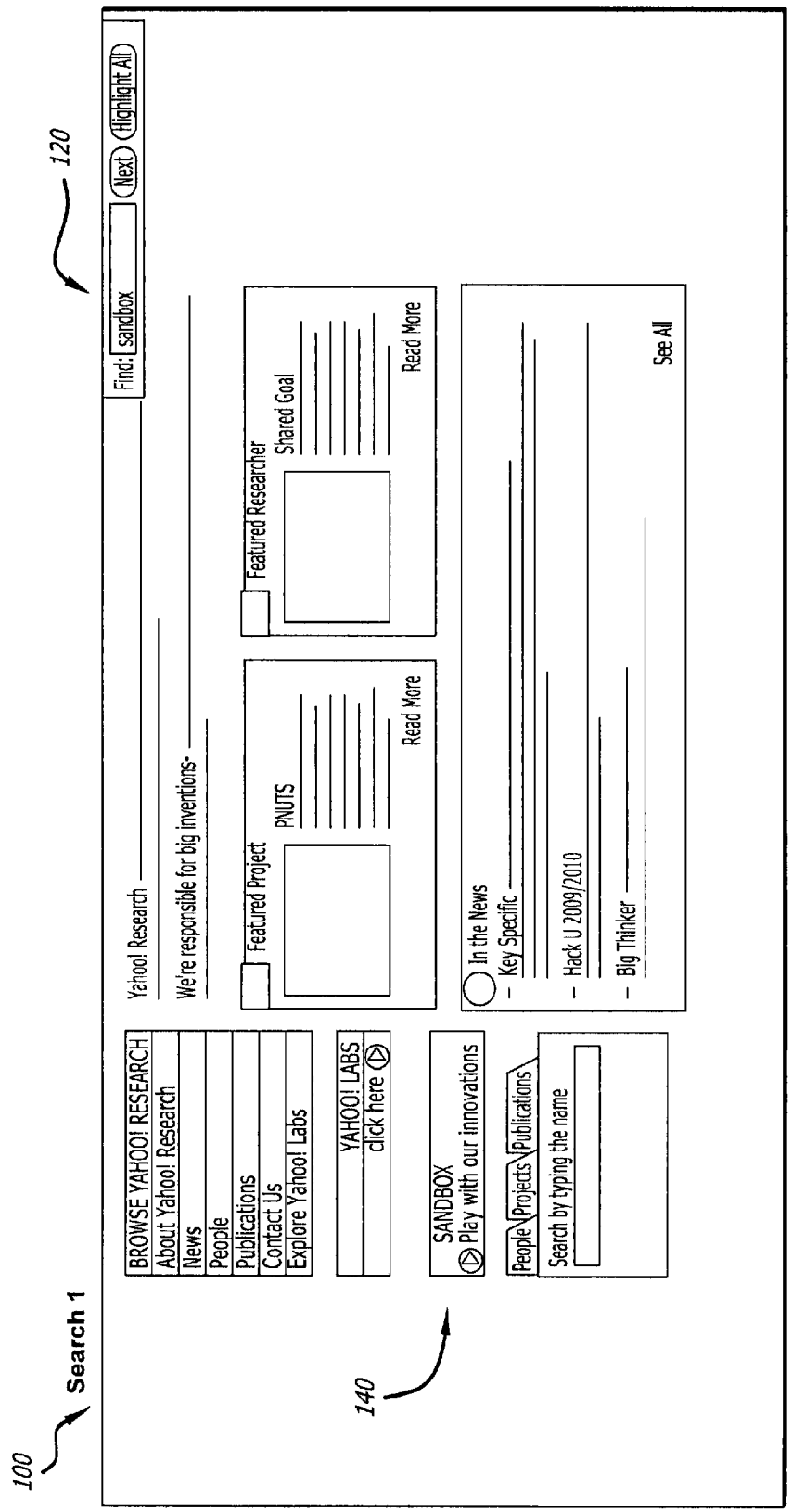
FIG. 1 illustrates one embodiment of an in-page search that locates a linked image related to a search string "sandbox".

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure the term "end user" or "user" should be understood to refer to a consumer of data supplied by a data provider or services provided by a service provider. By way of example, and not limitation, the term "end user" can refer to a person who receives data provided by a data provider over the Internet in a browser session, or can refer to an automated software application which receives the data and stores or processes the data. By way of example, and not limitation, the term "end user" can additionally or alternatively refer to a person who uses a service provided by a service provider over the Internet in a browser session, such as, for example, a recommendation system.

For the purposes of this disclosure the term "browser" or "web browser" should be understood to refer to any function of a computing device for retrieving, presenting, and traversing information resources over a network, such as the Internet. Information resources used by browsers are identified by a Uniform Resource Identifier (URI) and can be a web pages, images, video, or other any other type of digital content.

Hyperlinks present in resources enable users to navigate their browsers to related resources. Browsers are typically implemented as one or modules residing on end-user computing devices having data transmission and display capabilities, such as, without limitation, desktop and laptop computers, PDAs and mobile phones.

Web browsers commonly provide a function to find displayed text in web pages. For example, the Firefox browser displays a pop-up "Find" window when a user presses "CTRL-F" in which a user can type text the user wishes to locate in the web page. Such functions are limited, however, in that the functions typically only work on text nodes in the displayed web page.

The Document Object Model (DOM) for web pages provides for a great deal more information than text nodes. Some information, such as information relating to the structure of the page is of little or no interest in a find-in-page operation. Other information, such as metadata describing an image or media object embedded in the page, may, however, may prove useful.

For example, metadata present in a web page that are particularly relevant to multi-media objects include:
  alt, title and parts of src of an image element or area element;
  title and parts of href associated with an anchor element;
  parts of src, flashvars, title and parts of href in any embedded objects (as applicable);
  title of parent container of any of the above mentioned elements; and
  attributes relating to visible content and tags.

Beyond in-page metadata, there may be a great deal more information relating to embedded objects in a web page that is available outside of the HTML code of a webpage displayed by a browser. One of the most important types of data relating to embedded objects is metadata stored in the object source. For example, the title and description of a Flash-type video may be stored in the head of the source SWF file. Such metadata is often used by search engines to index files by keyword and key phrases extracted from the metadata, but is typically not accessed by web browsers.

Additionally, a media object may be embedded in multiple webpages on various unrelated websites. Each such webpage may provide additional metadata about the object. Multimedia search engines can be configured to crawl the web and collect metadata for all multimedia objects found. In one embodiment, such metadata can be indexed by the digital fingerprint of the objects. Digital fingerprinting represents various techniques in which the characteristic components of digital objects are identified, extracted and compressed to create a unique identifier for the object. Various fingerprinting techniques, such as single feature vector techniques, can accurately identify digital objects even where the object has been renamed or altered (e.g. cropped or saved at a lower resolution). Such metadata is often used by search engines to index files by keyword and key phrases extracted from the metadata, but is typically not accessed by web browsers.

All or any combination, of the metadata sources listed above could be used in an enhanced find-in-page web browser function.

For example, a user may wish to find images in a page relating to, e.g. a sandbox or a specific person, e.g. "Brad". Such images may be embedded in a web page, but no adjacent text nodes may contain text including the string "sandbox" or "brad". Alternatively, a user might be searching for the phrase "sandbox" assuming that it would be present as a text node (inside a link) but instead there is an image that displays that phrase. Metadata for such images or for the parent container of such images may include such text, for example, alt, title and parts of src of an image element may contain text including the string "sandbox" or "brad".

FIG. 1 illustrates one embodiment of an in-page search 100 that locates a linked image related to a search string "sandbox". A web page in containing, among other things, linked images, is displayed in a browser window. One of the linked images relates to the concept "sandbox". There is no text node including the text "sandbox". If a user uses a find-in-page search function that is limited to text nodes, a search using the string "sandbox" yields no result.

In the illustrated embodiment, the user has entered the "sandbox" search string into an enhanced find-in-page search function 120 and clicked the "Next" button. The enhanced find-in-page search function searches, among other things, metadata associated with linked images in the page. In the illustrated embodiment, the metadata associated with the linked image 140 includes the string "sandbox" in the alt text field. In the illustrated embodiment, the enhanced find-in-page search function could highlight the image 140 by, for example, displaying a bold red box around the image, although any technique known in the art could be used to highlight the image or otherwise draw the user's attention to the image.

Figure 2:
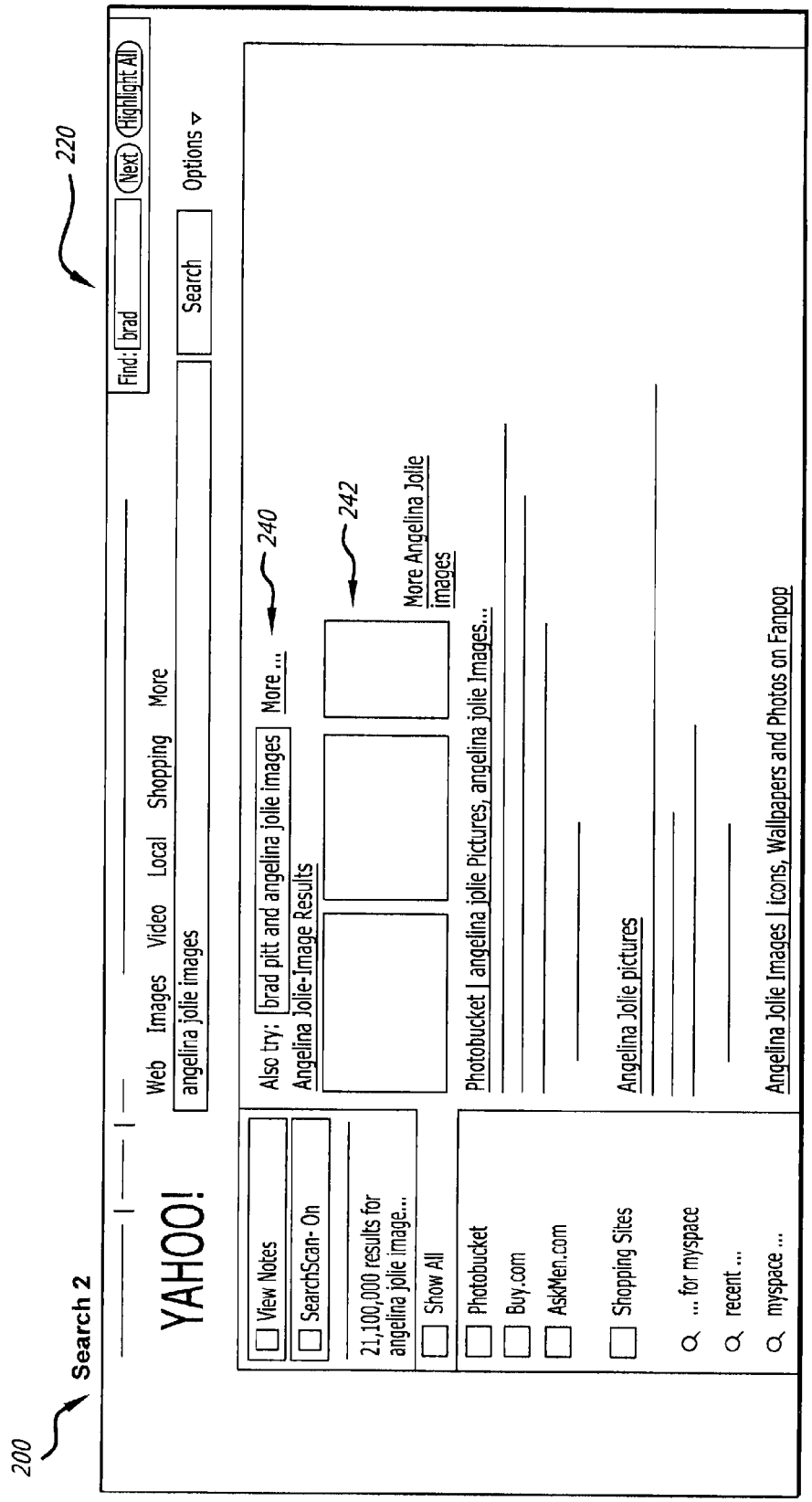
FIG. 2 illustrates one embodiment of an in-page search that locates multiple images in a search result page related to a search string "brad".

FIG. 2 illustrates one embodiment of an in-page search 200 that locates multiple images in a search result page related to a search string "brad". A web page displays a search result, including, among other things, a number of images (in this case, a search result provided by the Yahoo web search website), in a browser window. Three of the clustered images relates to the concept "brad". If a user uses a find-in-page search function that is limited to text nodes, a search on the string "brad" yields only identifies text nodes containing "brad" 240.

In the illustrated embodiment, the user has entered the "brad" search string into an enhanced find-in-page search function 220 and clicked the "Highlight All" button. The enhanced find-in-page search function searches, among other things, metadata associated with the clustered images. In the illustrated embodiment, the metadata associated with three images 242 includes the string "brad" in the title and the alt metadata. In the illustrated embodiment, the enhanced find-in-page search function could highlight the images 242 by, for example, displaying a bold red box around the images, although any technique known in the art could be used to highlight the image or otherwise draw the user's attention to the images.

Figure 3:
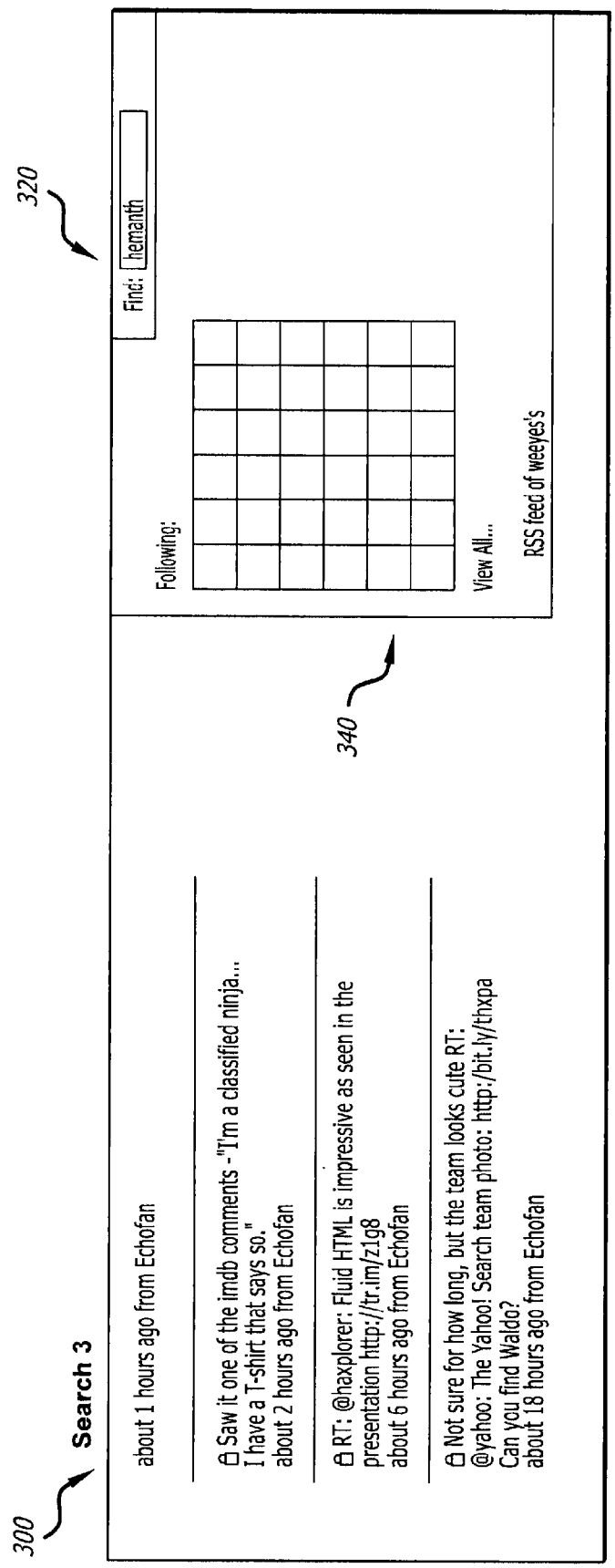
FIG. 3 illustrates one embodiment of an in-page search that locates a single image among a cluster of images related to a search string "hemanth".

FIG. 3 illustrates one embodiment of an in-page search 300 that locates a single image among a cluster of images related to a search string "hemanth". A web page containing, among other things, a cluster of images (in this case, a page from the Facebook website), is displayed in a browser window. One of the clustered images relates to the concept "hemanth" (a user name). There is no text node including the text "hemanth". If a user uses a find-in-page search function that is limited to text nodes, a search on the string "hemanth" yields no result.

In the illustrated embodiment, the user has entered the "hemanth" search string into an enhanced find-in-page search function 320 and clicked the "Next" button. The enhanced find-in-page search function searches, among other things, metadata associated with the clustered images. In the illustrated embodiment, the metadata associated with the clustered image 340 includes the string "hemanth" in the alt text field. In the illustrated embodiment, the enhanced find-in-page search function could highlight the image 340 by, for example, displaying a bold red box around the image, although any technique known in the art could be used to highlight the image or otherwise draw the user's attention to the images.

In another example, a user may wish to find anchors in a page (e.g. visible hyperlinks) for a website, e.g. "www.kango.com". Such anchors may be embedded in a web page, but no adjacent text nodes may contain text including the string "kango"". However, metadata for such anchors may include such text, for example, title and parts of href of an anchor may contain text including the string "kango".

Figure 4:
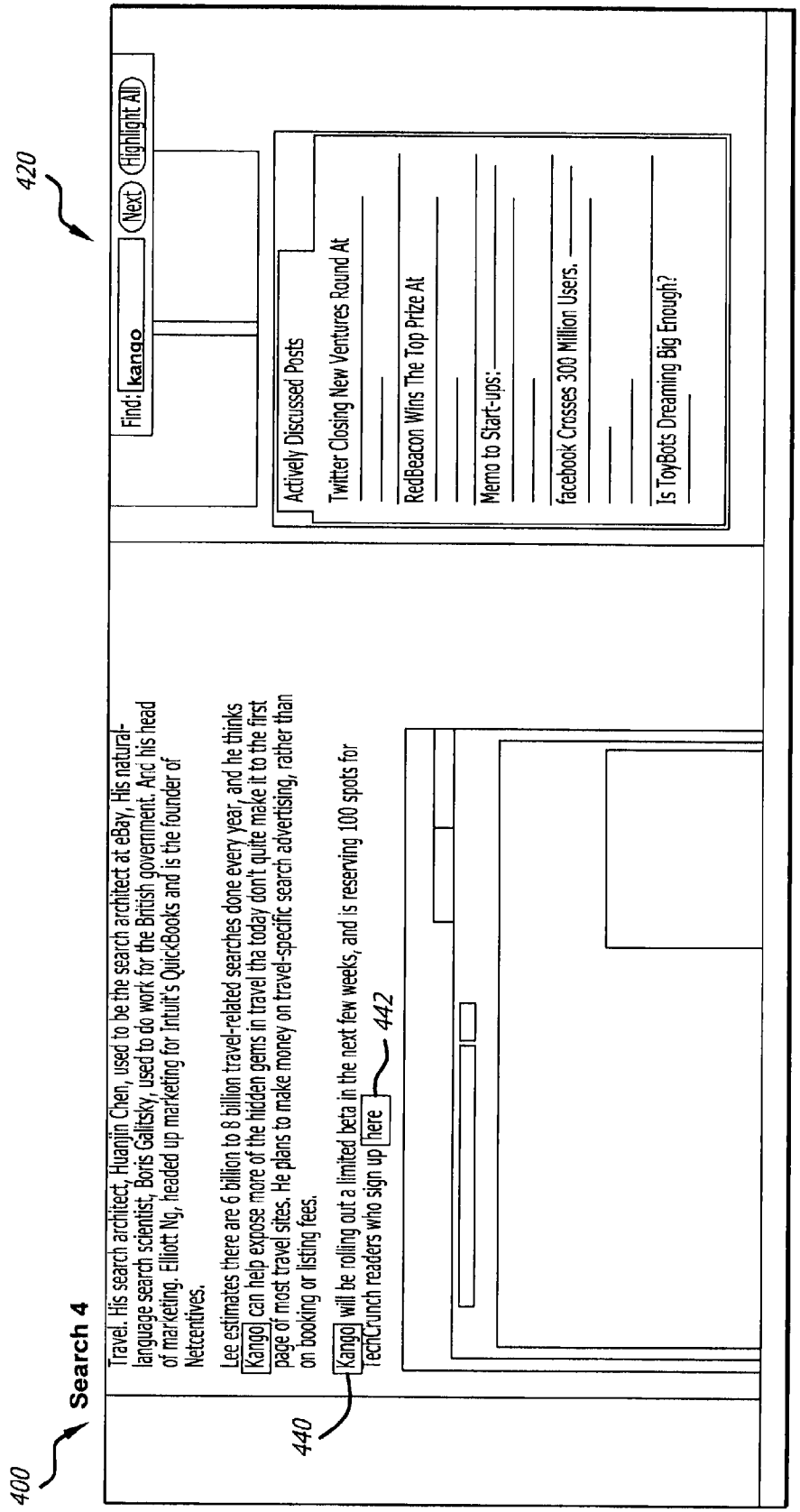
FIG. 4 illustrates one embodiment of an in-page search that locates anchors for hyperlinks to web pages having domain names including the search string "kango".

FIG. 4 illustrates one embodiment of an in-page search 400 that locates anchors for hyperlinks to web pages having domain names including the search string "kango". A web page displays, among other things, an anchor for a hyperlink to a website, http://www.kango.com/TechCrunch, displayed as "here". There is no text node associated with the anchor including the string "kango". If a user uses a find-in-page search function that is limited to text nodes, a search on the string "kango" only identifies text nodes containing "kango" 440.

In the illustrated embodiment, the user has entered the "kango" search string into an enhanced find-in-page search function 420 and clicked the "Highlight All" button. The enhanced find-in-page search function searches, among other things, domain names within hyperlinks to web sites. In the illustrated embodiment, the hyperlink "here" 442 includes the string "kango" in the domain name associated with the hyperlink. In the illustrated embodiment, the enhanced find-in-page search function could highlight the hyperlink 442 by, for example, displaying a bold red box around the hyperlink, although any technique known in the art could be used to highlight the image or otherwise draw the user's attention to the images.

In another example, a user may wish to find videos in a page for a keyword, e.g. "knack". Such videos may be embedded in a web page, but no adjacent text nodes may contain text including the string "knack". However, metadata for such anchors may include such text, for example, title and parts of href of an video may contain text including the string "knack".

Figure 5:
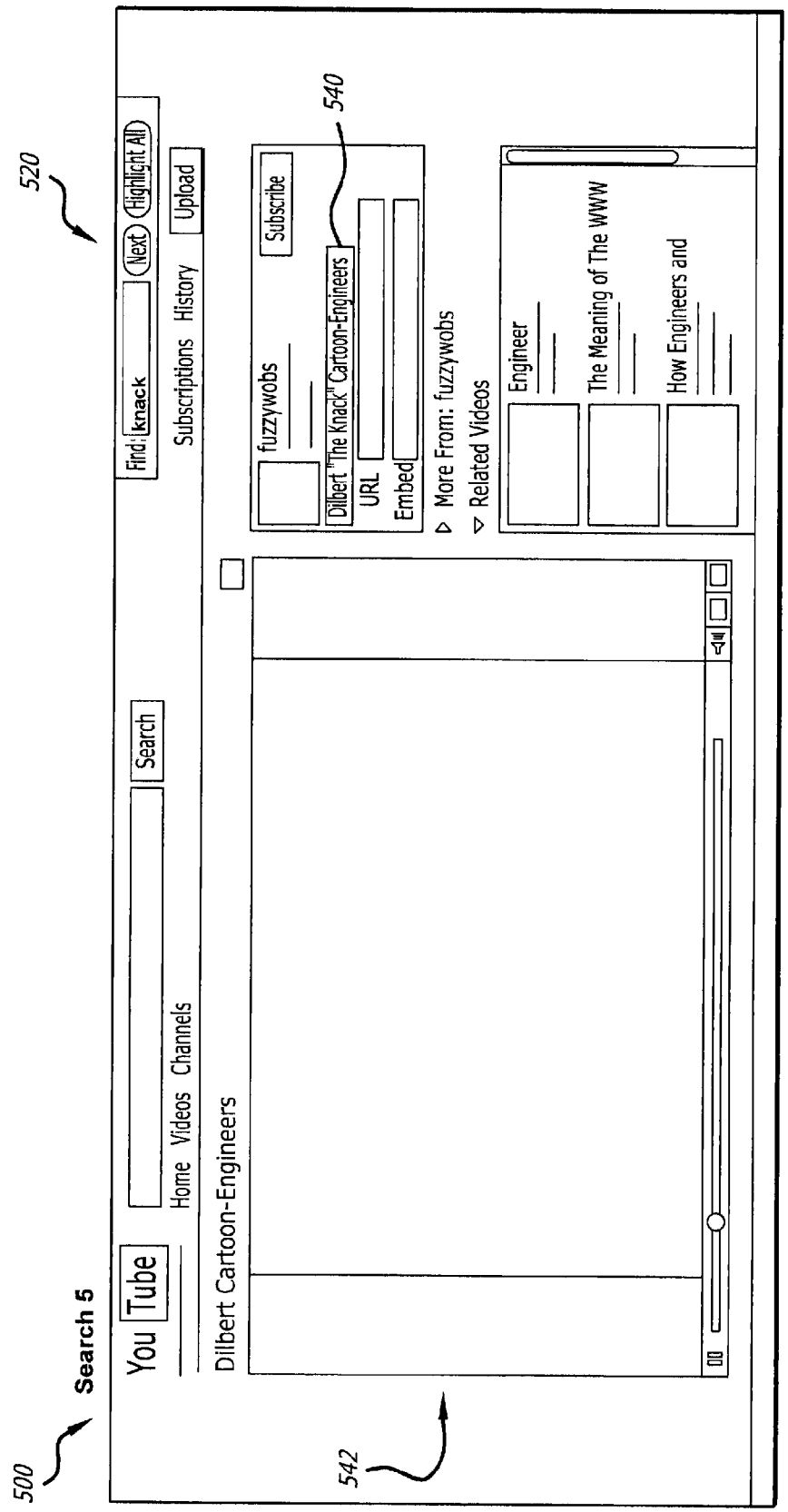
FIG. 5 illustrates one embodiment of an in-page search that locates linked audiovisual objects in a web page related to a search string "knack".

FIG. 5 illustrates one embodiment of an in-page search 500 that locates linked audiovisual objects in a web page related to a search string "knack". A web page displays, among other things, a link to a video (in this case, a video page provided by the YouTube website) displayed in a browser window. The video relates to the concept "knack" (the title of the video is "The Knack"). There is no text node associated with the video link including the text "knack". If a user uses a find-in-page search function that is limited to text nodes, a search on the string "knack" yields only identifies text nodes containing "knack" 540.

In the illustrated embodiment, the user has entered the "knack" search string into an enhanced find-in-page search function 520 and clicked the "Highlight All" button. The enhanced find-in-page search function searches, among other things, metadata associated with the linked video. In the illustrated embodiment, the metadata associated with three images 542 includes the string "knack" in the description field and the keyword field. The enhanced find-in-page search function could highlight the video 542 by, for example, displaying a bold red box around the video display window.

In another example, a user may wish to find Flash (e.g SWF) videos in a page for a keyword, e.g. "trailer" (i.e. movie trailer). Such Flash videos could be embedded in a web page, but no adjacent text nodes may contain text including the string "trailer". However, metadata for such objects may include "trailer" in, for example, csrc, flashvars title and parts of href metadata fields.

In the embodiments shown in FIG. 1-4, the find-in-page function could search metadata present in the source of the objects embedded in the displayed page in addition to the metadata embedded in the HTML code of the page. In the embodiments shown in FIG. 1-4, the find-in-page function could additionally send a search query to a multimedia search backend with the URLs of all multimedia objects present on the page such that the multimedia search backend retrieves the fingerprints of all object URLs and returns the aggregate metadata for such objects to the browser. The find-in-page function could then search such aggregated metadata in addition to metadata present in the source of the objects embedded in the displayed page and embedded in the HTML code of the page.

Various enhancements of the behavior of the find-in-page function can be implemented to improve the user's experience. In one embodiment, results of a find-in-page operation can be cycled in the order they appear on the page; left to right and top to bottom. In an alternative embodiment, a relevancy for all displayed, embedded objects in a web page to a find-in page search query is retrieved from a multimedia search engine and the results of a find-in-page operation are cycled in the order of relevancy. Such an embodiment might have particular relevance to browsers on hand-held devices (Smartphones/PDAs). In such browsers, multimedia content is typically not rendered if it is too big, since the screen space is limited. The constrained space thus makes the relevant search results important since a user might not want to go over all text matches and jump directly to the most relevant one.

In one embodiment, a find-in-page operation applies only to the web page displayed in the current tab of a single window of a web browser. In an alternative embodiment, a find-in-page operation applies to web pages displayed in all tabs of a web browser, and/or web pages displayed in multiple browser windows displayed in the same user session.

Figure 6:
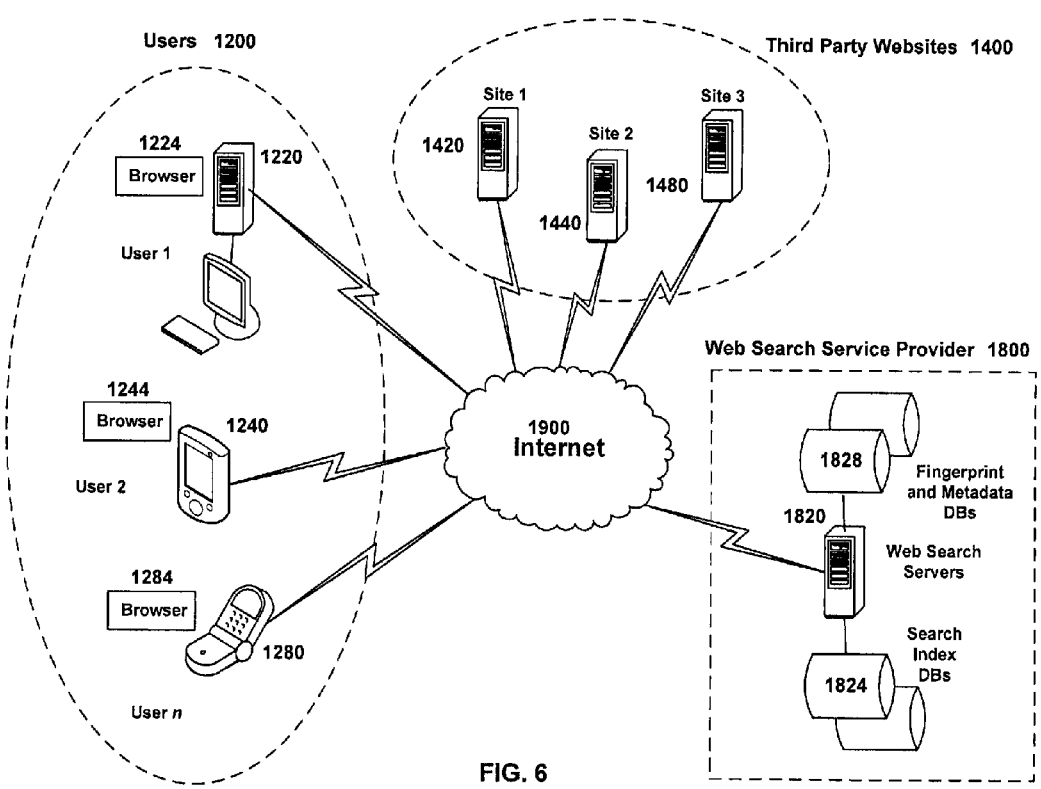
FIG. 6 illustrates one embodiment of a system capable of supporting at least one embodiment of an enhanced find-in-page browser function.

FIG. 6 illustrates one embodiment of a system capable of supporting at least one embodiment of an enhanced find-in-page browser function.

A number of users 1200 access the Internet 1900 using various network connectable devices such as desktop PCs 1220, PDAs 1240, and mobile phones 1280. Each of the devices 1220, 1240 and 1280 support at least one web browser, 1224, 1244 and 1284 respectively. Periodically, each of the users 1200 browse third party websites 1400 using web browsers implemented on their respective devices. Each of the website providers 1420, 1440 and 1480 host one or more websites which include webpages with embedded data objects, including media objects such as image files, sound files and video files.

Periodically, each of the users 1200 also utilizes web search services provided by a web search services provider 1800. The users 1200 access web search service over the Internet 1900 using web browsers implemented on their respective devices. Within the web search service provider 1800, web search servers 1820 periodically crawl the third party websites 1400 for the purpose of updating search index DBs 1824 which are required to support the web search services provided by the provider. Additionally, the web search servers 1820 fingerprint data objects embedded in the webpages and updates fingerprint and metadata DBs 1828 which are used to aggregate all metadata related to specific fingerprints.

Each of the users 1200 web browsers 1224, 1244 and 1284 provide an embodiment of the enhanced find-in-page functions described above. The find-in-page function allow users 1200 to search a webpage displayed on the browsers for data objects which relate to a search string. In one embodiment, the enhanced find-in-page function collects metadata related to objects displayed on the webpage from the HTML code implementing the webpage. Additionally or alternatively, the enhanced find-in-page function collects metadata related to objects displayed on the webpage from the source data for each object. Additionally or alternatively, the enhanced find-in-page function retrieves metadata related to objects displayed on the webpage using multimedia search services provided by the web search service provider 1800.

Figure 7:
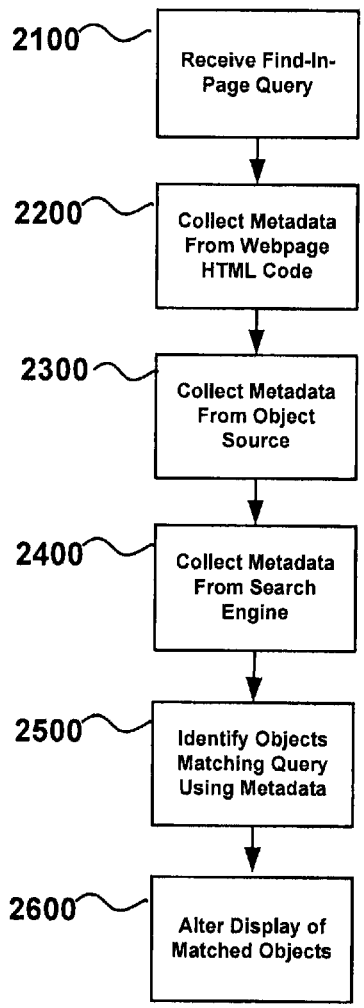
FIG. 7 illustrates one embodiment of a process for implementing one embodiment of an enhanced find-in-page browser function.

FIG. 7 illustrates one embodiment of a process 2000 for implementing one embodiment of an enhanced find-in-page browser function.

A find-in-page query is received 2100 for at least one webpage displayed on a computing device, wherein the query comprises a search string. The query can transmitted by a find-in-page query function invoked by, for example, a combination of control keys, or via a toolbar on the browser. The search string can comprise one or more words the user intends to locate in the webpage.

A first set of metadata relating to each of a plurality of data objects displayed on the webpage is collected 2200, using the computing device, wherein the first set of metadata is collected from the HTML code comprising the webpage. Objects displayed on the webpage can include embedded media objects, such as images, videos, and other types of multimedia objects. Embedded data objects can also include anchors for links to other websites.

The metadata collected relating to data objects can include any HTML tag. Such tags could include: alt, title and parts of src of an image element or area element; title and parts of href associated with an anchor element; parts of src, flashvars, title and parts of href in any embedded object (as applicable); title of parent container of any of the above mentioned elements; and attributes relating to visible content and tags A second set of metadata relating to each of the plurality of data objects is collected 2300, using the computing device, wherein the second set of metadata is collected from the source of the plurality of objects. Embedded data objects may include various types of metadata. Certain types of such metadata may be of relatively little interest, such as, for example, in a JPEG file, metadata can include the type of device used to create the file. Other types of metadata that relate to the content of the file may be highly relevant. For example, the title and description of a Flash-type video may be stored in the head of the source SWF file.

A third set of metadata relating to each of the plurality of data objects is collected 2400, using the computing device, wherein the third set of metadata is retrieved, over a network, from at least one search engine. In one embodiment, a search query is sent to a multimedia search backend with the URLs of all multimedia objects present on the page such that the multimedia search backend retrieves the fingerprints of all object URLs and returns the aggregate metadata for such objects to the browser. In one embodiment, a simple BOSS query is used.

At least one of the plurality of data objects matching the find-in-page query is identified 2500, using the computing device, wherein the search string is matched to metadata in the first, second and third sets of metadata. The display of the matching data objects on the webpage is then altered 2600, using the computing device, whereby the user is able to identify the data objects which match the find-in-page query.

In one embodiment, the display of the first object whose metadata matched the query is altered. In one embodiment, a "next" function is provided that alters the display of matching data objects one at a time in response to a user interface event. In one such embodiment, the "next" function alters the display of objects in a left to right, top to bottom sequence on the webpage. In another such embodiment, the "next" function retrieves a rank for the objects from a search engine and alters the display of objects from the highest rank to the lowest rank on the webpage. The objects can be ranked, for example, by a search engine for relevance to the find-in-page query. In one embodiment, the display of all objects whose metadata matched the query is altered. In one embodiment the display of the matching data objects is altered by displaying a box around the object display.

The process above could be performed for a single webpage, for all tabs in a web browser window, or for all active web browser sessions on a single device.

Figure 8:
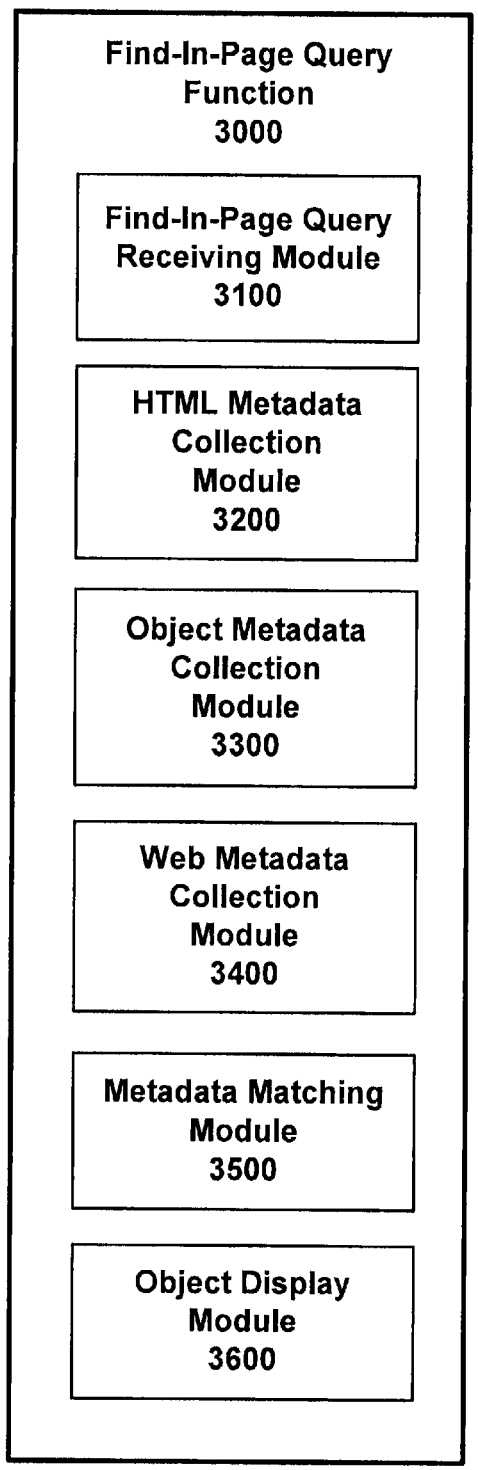
FIG. 8 illustrates one embodiment of a find-in-page function in a web browser capable of supporting the process illustrated FIG. 7.

FIG. 8 illustrates one embodiment of a find-in-page function in a web browser 3000 capable of supporting the process illustrated FIG. 7. In one embodiment, a find-in-page function in a web browser 3000 comprises a find-in-page query receiving module 3100, an HTML metadata collection module 3200, an object metadata collection module 3300, a web metadata collection module 3400, a metadata matching module 3500 and an object display module 3600. In one embodiment, each of the modules comprises one or more processors programmed to execute software code retrieved from a computer readable storage medium storing software for functions as described below.

In one embodiment, the rating receiving module 3100 is configured to receive find-in-page queries for a webpage displayed on a computing device, wherein the query comprises a search string. In various embodiments, the find-in-page query function can be invoked, for example, a combination of control keys, or via a toolbar on the browser. The search string can comprise one or more words the user intends to locate in the webpage.

In one embodiment, the HTML metadata collection module 3200 is configured to collect a first set of metadata relating to each of a plurality of data objects displayed on the webpage, wherein the first set of metadata is collected from the HTML code comprising the webpage. The metadata collected relating to data objects can include: alt, title and parts of src of an image element or area element; title and parts of href associated with an anchor element; parts of src, flashvars, title and parts of href in any embedded objects (as applicable); title of parent container of any of the above mentioned elements; and attributes relating to visible content and tags In one embodiment, the object metadata collection module 3300 is configured to collect a second set of metadata relating to each of the plurality of data objects, wherein the second set of metadata is collected from the source of the of the plurality of objects.

In one embodiment, the web metadata collection module 3400 is configured to collect a third set of metadata relating to each of the plurality of data objects, wherein the third set of metadata is retrieved, over a network, from at least one search engine. In one embodiment, a search query is sent to a multimedia search backend with the URLs of all multimedia objects present on the page such that the multimedia search backend retrieves the fingerprints of all object URLs and returns the aggregate metadata for such objects to the browser. In one embodiment, a simple BOSS query is used.

In one embodiment, the metadata matching module 3500 is configured to identify at least one of the plurality of data objects which matches the find-in-page query, wherein the search string is matched to metadata in the first, second and third sets of metadata.

In one embodiment, the object display module 3600 is configured to alter the display of the matching data objects on the webpage, whereby the user is able to identify the data objects that match the find-in-page query. In one embodiment, the display of the first object whose metadata matched the query is altered. In one embodiment, a "next" function is provided that alters the display of matching data objects one at a time in response to a user interface event. In one such embodiment, the "next" function alters the display of objects in a left to right, top to bottom sequence on the webpage. In another such embodiment, the "next" function retrieves a rank for the objects from a search engine and alters the display of objects from the highest rank to the lowest rank on the webpage. The objects can be ranked, for example, by a search engine for relevance to the find-in-page query. In one embodiment, the display of all objects whose metadata matched the query is altered. In one embodiment, the display of the matching data objects is altered by displaying a box around the object display.

The function could be configured to act on a single webpage, on all tabs in a web browser window, or on all active web browser sessions on a single device.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising the steps of:
   receiving, using a computing device, a find-in-page query, from a user, relating to a webpage of a website displayed by a web browser on the computing device, the query comprising a search string of characters the user is searching for in the webpage, wherein the find-in-page query is invoked by a function of the web browser;

collecting, using the computing device, a first set of metadata relating to each of a plurality of data objects displayed on the webpage, such that the first set of metadata is collected from the HyperText Markup Language (HTML) code comprising the webpage relating to at least one respective data object of the plurality of data objects displayed on the webpage;

collecting, using the computing device, a second set of metadata relating to each of the plurality of data objects, such that the second set of metadata is collected from the respective source code of each data object of the plurality of data objects;

collecting, using the computing device, a third set of metadata relating to each of the plurality of data objects, using the computing device, such that the third set of metadata is collected, over a network, via communication with a search engine, such that at least a subset of the third set of metadata originates from a plurality of additional websites;

identifying, using the computing device, at least a subset of the plurality of data objects matching the find-in-page query such that the search string is matched to metadata in the first, second and third sets of metadata, such that the metadata relating to the identified at least a subset of the plurality of data objects comprises the search string;

altering, using the computing device, the display of the of the at least a subset of the plurality of data objects on the webpage, such that the user is able to identify each of the at least a subset of the plurality of data objects.

2. The method of claim 1 wherein at least some of the plurality of data objects are of an object type selected from the list: image, video, flash, text node, anchor, area.

3. The method of claim 2 wherein the metadata collected from the HTML code includes data from at least one HTML tag.

4. The method of claim 2 wherein at least one of the plurality of data objects is of the object type anchor, and the metadata collected from the HTML code includes a title and an href associated with the at least one of the plurality of data objects.

5. The method of claim 2 wherein at least one of the plurality of data objects is of the object type image, and the metadata collected from the HTML code includes an alt, a title and a src associated with the at least one of the plurality of data objects.

6. The method of claim 2 wherein at least one of the plurality of data objects is of the object type image, and the metadata collected from the HTML code includes a title of a parent container of the at least one of the plurality of data objects.

7. The method of claim 1 wherein the third set of metadata is collected using the search engine by sending a search query to the search engine, wherein the search query comprises a Uniform Resource Locator (URL) for each of the plurality of data objects, whereby the search engine retrieves a fingerprint for each of the plurality of data objects and returns aggregated metadata for each respective object.

8. The method of claim 7 wherein the search query is a Build your own Search Service (BOSS) query.

9. The method of claim 1 wherein the display of a first one of the at least a subset of the plurality of data objects matching the find-in-page query is altered.

10. The method of claim 1 wherein the display of the at least a subset of the plurality of data objects matching the find-in-page query is altered one at a time in response to a user interface event.

11. The method of claim 10 wherein the display of the at least one of the plurality of data objects is altered in a left to right, top to bottom sequence on the at least one webpage.

12. The method of claim 10 wherein a rank is retrieved for the at least one of the plurality of data objects from the search engine, and wherein the display of the at least one of the plurality of data objects is altered in a highest rank to the lowest rank sequence on the at least one webpage.

13. The method of claim 1 wherein the webpage comprises a first webpage of a first website and a second webpage of a second website, wherein the first webpage and the second webpage are displayed in different tabs in a single web browser session, and wherein the find-in-page query is applied to the first webpage and the second webpage.

14. The method of claim 1 wherein the webpage comprises a first webpage of a first website and a second webpage of a second website, wherein the first webpage and the second webpage are displayed in different web browser sessions, and wherein the find-in-page query is applied to the first webpage and the second webpage.

15. A system comprising:
a processor;
a storage medium for tangibly storing thereon program logic for execution by the processor, the program logic comprising:
find-in-page query receiving logic executed by the processor for receiving a find-in-page query, from a user, relating to a webpage of a website displayed by a web browser, the query comprising a search string of characters the user is searching for in the webpage, wherein the find-in-page query is invoked by a function of the web browser;
HyperText Markup Language (HTML) metadata collection logic executed by the processor for a first set of metadata relating to each of a plurality of data objects displayed on the webpage, such that the first set of metadata is collected from the HTML code comprising the webpage relating to at least one respective data object of the plurality of data objects displayed on the webpage;
object metadata collection logic executed by the processor for a second set of metadata relating to each of the plurality of data objects, such that the second set of metadata is collected from the respective source code of each data object of the plurality of data objects;
web metadata collection logic executed by the processor collecting a third set of metadata relating to each of the plurality of data objects, using the computing device, such that the third set of metadata is collected, over a network, via communication with a search engine, such that at least a subset of the third set of metadata originates from a plurality of additional websites;
metadata matching logic executed by the processor for identifying at least a subset of the plurality of data objects matching the find-in-page query such that the search string is matched to metadata in the first, second and third sets of metadata, such that the metadata relating to the identified at least a subset of the plurality of data objects comprises the search string; and
object display logic executed by the processor for altering the display of the of the at least a subset of the plurality of data objects on the webpage, such that the user is able to identify each of the at least a subset of the plurality of data objects.

16. The system of claim 15 wherein at least some of the plurality of data objects are of an object type selected from the list: image, video, flash, text node, anchor, area.

17. The system of claim 16 wherein the metadata collected from the HTML code includes data from at least one HTML tag.

18. The system of claim 15 wherein the third set of metadata is collected using the search engine by sending a search query to the search engine, wherein the search query comprises a Uniform Resource Locator (URL) for each of the plurality of data objects, such that the search engine retrieves a fingerprint for each of the plurality of data objects and returns aggregated metadata for each respective object.

19. The system of claim 15 wherein the display of a first one of the at least a subset of the plurality of data objects matching the find-in-page query is altered.

20. The system of claim 15 wherein the webpage comprises a first webpage of a first website and a second webpage of a second website, wherein the first webpage and the second webpage are displayed in different tabs in a single web browser session, and wherein the find-in-page query is applied to the first webpage and the second webpage.

21. The system of claim 15 wherein the at least one webpage is at least two webpages, and wherein the at least two webpages are displayed in different web browser sessions.

22. A non-transitory computer readable storage media for tangibly storing thereon computer readable instructions, that when executed by a computing device, perform a method comprising the steps of:
   receiving a find-in-page query, from a user, relating to a webpage of a website displayed by a web browser, the query comprising a search string of characters the user is searching for in the webpage, wherein the find-in-page query is invoked by a function of the web browser;
   collecting a first set of metadata relating to each of a plurality of data objects displayed on the webpage, such that the first set of metadata is collected from the HyperText Markup Language (HTML) code comprising the webpage relating to at least one respective data object of the plurality of data objects displayed on the webpage;
   collecting a second set of metadata relating to each of the plurality of data objects, such that the second set of metadata is collected from the respective source code of each data object of the plurality of data objects;
   collecting a third set of metadata relating to each of the plurality of data objects, using the computing device, such that the third set of metadata is collected, over a network, via communication with a search engine, such that at least a subset of the third set of metadata originates from a plurality of additional websites;
   identifying at least a subset of the plurality of data objects matching the find-in-page query such that the search string is matched to metadata in the first, second and third sets of metadata, such that the metadata relating to the identified at least a subset of the plurality of data objects comprises the search string;
   altering the display of the of the at least a subset of the plurality of data objects on the webpage, such that the user is able to identify each of the at least a subset of the plurality of data objects.

23. The non-transitory computer readable storage media of claim 22 wherein at least some of the plurality of data objects are of an object type selected from the list: image, video, flash, text node, anchor, area.

24. The non-transitory computer readable storage media of claim 23 wherein the metadata collected from the HTML code includes data from at least one HTML tag.

25. The non-transitory computer readable storage media of claim 22 wherein the third set of metadata is collected using the search engine by sending a search query to the search engine, wherein the search query comprises a Uniform Resource Locator (URL) for each of the plurality of data objects, such that the search engine retrieves a fingerprint for each of the plurality of data objects and returns aggregated metadata for each respective object.

26. The non-transitory computer readable storage media of claim 22 wherein the display of a first one of the at least one of the plurality of data objects matching the find-in-page query is altered.

27. The non-transitory computer readable storage media of claim 22 wherein the webpage comprises a first webpage of a first website and a second webpage of a second website, wherein the first webpage and the second webpage are displayed in different tabs in a single web browser session, and wherein the find-in-page query is applied to the first webpage and the second webpage.

28. The non-transitory computer readable storage media of claim 22 wherein the webpage comprises a first webpage of a first website and a second webpage of a second website, wherein the first webpage and the second webpage are displayed in different web browser sessions, and wherein the find-in-page query is applied to the first webpage and the second webpage.

* * * * *